United States Patent [19]

Lambregts

[11] 4,127,249

[45] Nov. 28, 1978

[54] APPARATUS FOR COMPUTING THE RATE OF CHANGE OF ENERGY OF AN AIRCRAFT

[75] Inventor: Antonius A. Lambregts, Renton, Wash.

[73] Assignee: The Boeing Company, Seattle, Wash.

[21] Appl. No.: 766,175

[22] Filed: Feb. 7, 1977

[51] Int. Cl.$^2$ ............................................. G05D 1/00
[52] U.S. Cl. ................................ 244/191; 73/178 R; 340/27 R; 364/424
[58] Field of Search .......... 35/10.2; 73/178 R, 178 T; 235/150.2, 150.22, 150.25; 244/3, 2, 175, 180–182, 191; 340/27 R, 27 NA; 364/428, 431, 453, 424

[56] References Cited

U.S. PATENT DOCUMENTS

| | | | |
|---|---|---|---|
| 3,748,900 | 7/1973 | Lindquist | 73/178 R |
| 3,789,661 | 2/1974 | Melsheimer | 73/178 T |
| 3,901,466 | 8/1975 | Lambregts | 244/182 |
| 3,989,208 | 11/1976 | Lambregts | 244/182 |

FOREIGN PATENT DOCUMENTS 2,250,747  4/1973  Fed. Rep. of Germany ........ 73/178 R

*Primary Examiner*—Stephen G. Kunin
*Attorney, Agent, or Firm*—Conrad O. Gardner; B. A. Donahue

[57] ABSTRACT

A rate of change of energy computer utilizing signal processing of the inner vectorial product of inertial acceleration and inertial velocity wherein such parameters are derived utilizing outputs from the aircraft INS (inertial navigation system) and from body mounted accelerometers.

11 Claims, 3 Drawing Figures

APPARATUS FOR COMPUTING THE RATE OF CHANGE OF ENERGY OF AN AIRCRAFT

This invention relates to apparatus for computing and systems for utilizing signals representative of the rate of change of energy of an aircraft and more particularly to such an apparatus or system for computing and utilizing rate of change of energy signals which are accurate over the entire aircraft operating envelope.

Optimal utilization of the kinetic and potential energy of an aircraft requires measurement of rate of change of energy. Such a rate of change of energy signal may be used in conjunction with utilization means such as an indicator to enable the pilot of the aircraft to perform a climb at maximum rate of change of energy either at constant engine power setting or at constant speed or at a constant flight path angle. Also, a descend maneuver at minimum rate of energy loss may be realized. Such a rate of change of energy system with indicator output to the pilot can therefore help optimize the performance of high performance aircraft and glider type aircraft. For these reasons efforts have been made to provide instrumentation measuring the rate of change of energy which have included e.g. U.S. Pat. No. 3,748,900 to Lindquist, U.S. Pat. No. 3,789,661 to Welsheimer, U.S. Pat. No. 3,667,293 to Moore, U.S. Pat. No. 3,258,582 to Winblade, and U.S. Pat. No. 3,774,017 to Zagalsky. The aforementioned U.S. patents make use of a combination of airspeed sensor, angle of attack sensor, and accelerometer outputs or rate of change of static pressure.

Since the systems exemplified by the hereinbefore referenced U.S. patents do not provide change of energy signals accurate over the entire aircraft operating envelope, it is accordingly an object of the present invention to provide signals representative of rate of change of energy accurate over the entire aircraft operating envelope.

It is a further object of the present invention to provide means for generating signals representative of the rate of change of specific energy ($\dot{e}$) utilizing signal processing means for computing the inner vectorial product of inertial acceleration and inertial velocity of the aircraft.

It is yet another object of this invention to provide circuit means responsive to body mounted accelerometers and the aircraft inertial navigation system for providing signals representative of rate of change of energy of the aircraft having accuracy unaffected by wind velocities, atmospheric pressures, angles of attack or airspeed of the aircraft.

These and other objects and advantages of this invention will be readily appreciated as the same becomes better understood by reference to the following detailed description when considered in connection with the accompanying drawing wherein.

Figure 1:
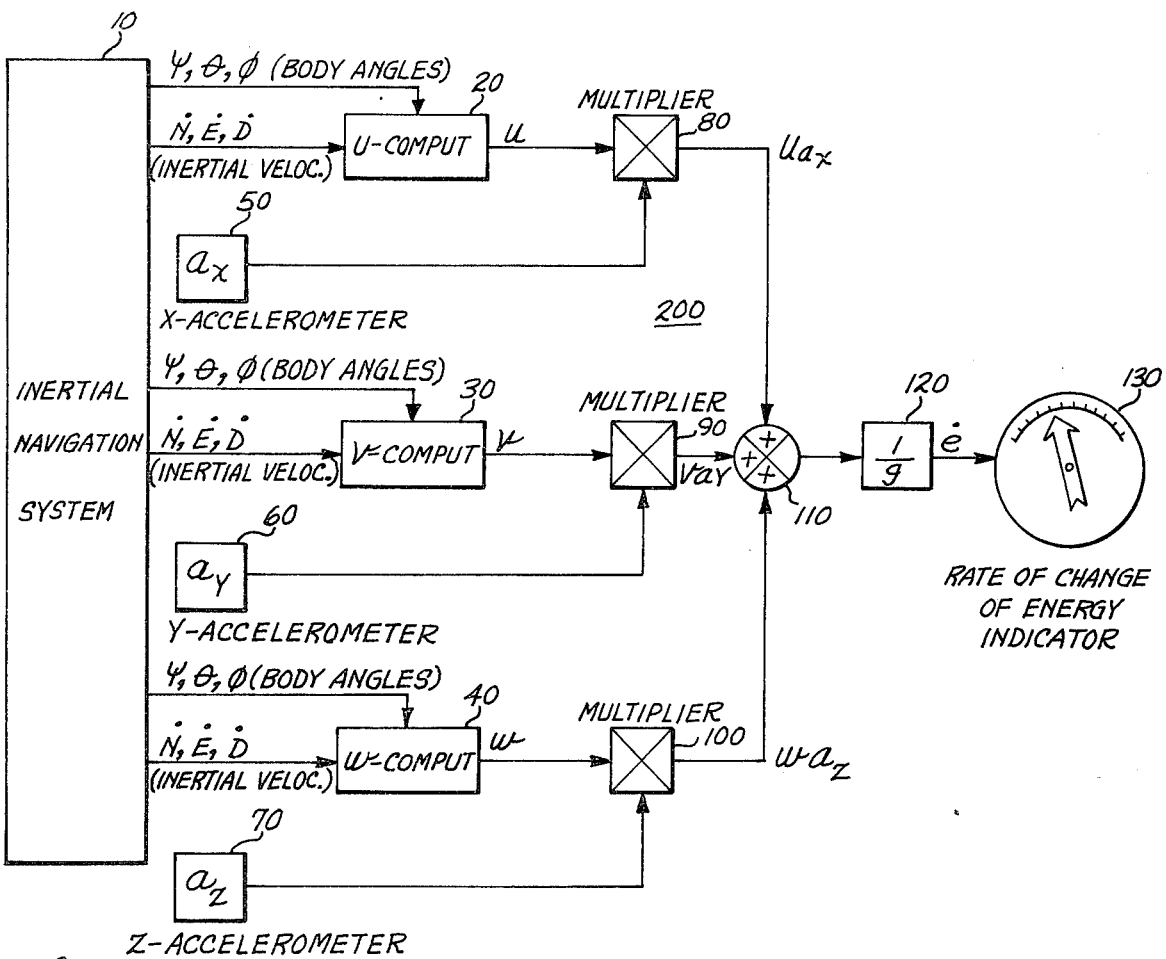
FIG. 1 shows a schematic and block diagram of a first system embodiment of the present invention showing in detail the method and apparatus for computation of rate of change of specific energy ($\dot{e}$)
Figure 2:
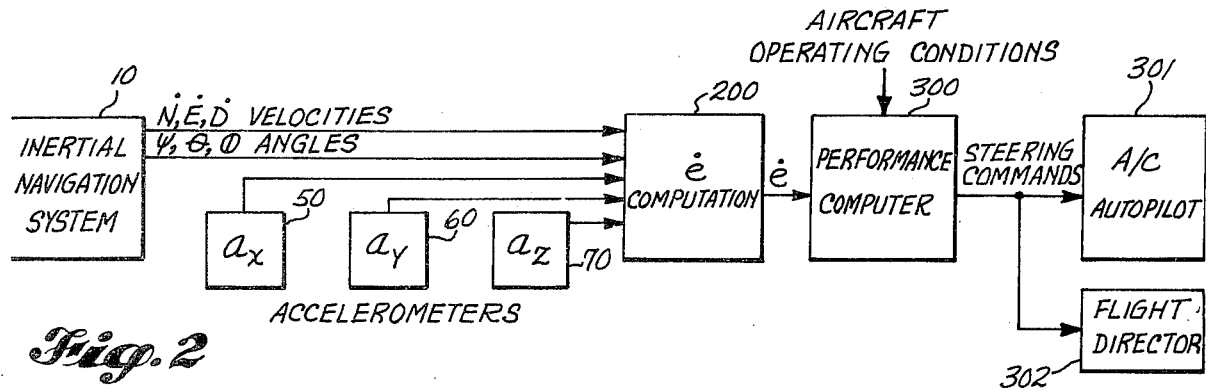
FIG. 2 is illustrative of a second system embodiment in block diagram.
Figure 3:
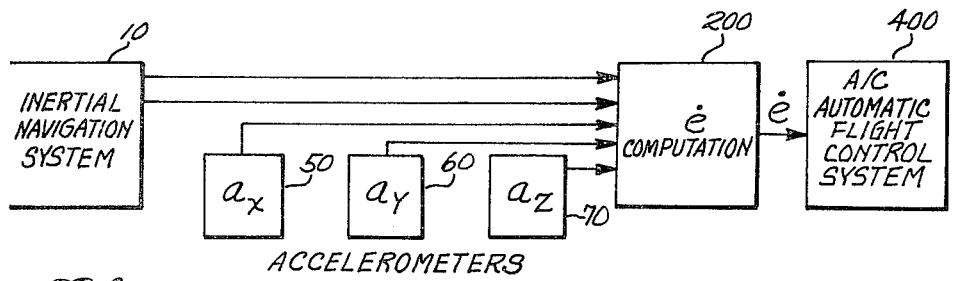
FIG. 3 is a block diagram illustrative of a third system embodiment of the present invention, utilizing computation circuitry for providing rate of change of specific energy ($\dot{e}$) shown in detail in FIG. 1.

Turning now to the system of FIG. 1 it will be noted that circuitry 200 upstream of rate of change of energy indicator 130 is utilized to compute signal $\dot{e}$ representative of rate of change of specific energy, rate of change of energy indicator 130 being utilized for display to the pilot. Alternative systems for utilization of the signal $e$ are shown in the systems of FIGS. 2 and 3 hereinafter discussed, but in connection therewith it may be noted here that because of the nature of the phugoid mode of oscillation of the aircraft whereby energy exchange takes place between altitude and speed, a rate of change of energy signal may be utilized in an automatic control system to improve mode damping and reduce coupling between speed and flight path control.

The method of computation and circuitry 200 for providing signals $\dot{e}$ representative of the rate of change of specific energy of an aircraft will best be understood from the following derivation of the rate of change of specific energy and the properties of the signals sensed by accelerometers 50, 60 and 70 mounted on the aircraft body at the location of the center of gravity of the aircraft and aligned with the orthogonal $x_b$, $y_b$ and $z_b$ axes:

Total energy expressed as $$E = 1/2 m V_i^2 + mgh$$

where
$m$ = aircraft mass
$V_i$ = inertial velocity
$g$ = acceleration due to gravity
$h$ = aircraft altitude The airplane weight W is $$W = mg$$

The energy per unit weight is the Specific Energy $e$:

$$e = \frac{V_i^2}{2g} + h$$

The Rate of Change of Specific Energy, $\dot{e}$, is $$\dot{e} = \frac{V_i \dot{V}_i}{g} + \dot{h} \tag{1}$$

and wherein $$V_i = (u^2 + v^2 + w^2)^{1/2} \tag{2}$$

$u$ = inertial velocity along the $X_b$ axis of the aircraft
$v$ = inertial velocity along the $Y_b$ axis of the aircraft
$w$ = inertial velocity along the $Z_b$ axis of the aircraft Then $$\dot{V}_i = \tfrac{1}{2}(u^2 + v^2 + w^2)^{-\tfrac{1}{2}} \cdot (2u\dot{u} + 2v\dot{v} + 2w\dot{w})$$
$$= \frac{u\dot{u} + v\dot{v} + w\dot{w}}{V_i} \tag{3}$$

and $$\dot{h} = u.\sin\theta - v.\sin\phi.\cos\theta - w.\cos\phi.\cos\theta \tag{4}$$

wherein
$\theta$ = airplane's pitch angle
$\phi$ = airplane's roll angle

Substitution of (3) and (4) into (1) yields:

$$\dot{e} = \frac{u\dot{u} + v\dot{v} + w\dot{w}}{g} + u.\sin\theta - v.\sin\phi.\cos\theta - w.\cos\phi.\cos\theta \quad (5)$$

The outputs from body mounted accelerometers aligned with the $x_b$, $y_b$ and $z_b$ axes are $$a_x = \dot{u} + g.\sin\theta - v.r + w.q$$

$$a_y = \dot{v} - g.\sin\phi.\cos\theta - w.p + u.r$$

$$a_z = \dot{w} - g.\cos\phi.\cos\phi - u.q + v.p \quad (6)$$

wherein
 $p =$ body axis roll rate
 $q =$ body axis pitch rate
 $r =$ body axis yaw rate Substitution of (6) in (5) yields after solving for $\dot{u}$, $\dot{v}$ and $\dot{w}$:

$$\dot{e} = \frac{u(a_x - g.\sin\theta + vr - wq) + v(a_y + g.\sin\phi.\cos\theta + wp - ur) + w(a_z + g.\cos\phi.\cos\theta + uq - vp)}{g} + \quad (7)$$

$$u.\sin\theta - v.\sin\phi.\cos\theta - w.\cos\phi.\cos\theta$$

$$= \frac{u.a_x + v.a_y + w.a_z}{g}$$

$$= \frac{\bar{V}_I \cdot \bar{a}}{g}$$

The rate of change of specific energy $\dot{e}$ is thus shown to be the inner vector product of inertial acceleration and inertial velocity and can be derived in accordance with the teachings of the present invention by using outputs $u$, $v$ and $w$ from the INS (inertial navigation system), and outputs $a_x$, $a_y$ and $a_z$ from body mounted accelerometers.

The resultant $\dot{e}$ is accurate regardless of wind, atmospheric pressure, angle of attack, airspeed, etc., since the basic sensors remain accurate and uninfluenced thereby in contrast to methods and systems exemplified in the aforementioned patent literature for developing signals representative of rate of change of energy.

Returning now to the circuitry 200 of FIG. 1 it will be appreciated that signals representative of velocity components $u$, $v$ and $w$ are not obtained directly from INS 10 but are computed at $u$ computer 20, $v$ computer 30, and $w$ computer 40 circuits, respectively, from earth axis velocities using the Euler angles also as inputs as shown in FIG. 1 and wherein:

representative of aircraft body angles $\Psi$, $\theta$, and $\phi$ from INS system 10 are thus seen processed in $u$ computer 20 to provide the velocity component $u$ along the $x_b$ axis of the aircraft in accordance with the first of equations (8). In passing it should be noted that signals representative of angles $\theta$ and $\phi$ can in the alternative be provided by vertical gyros and a signal representative of $\Psi$ provided by the aircraft magnetic heading reference system. Multiplier circuit 80 provides at the output thereof the signal $u.a_x$ representative of the product of the signal $u$ from the $u$ computer 20 and the signal $a_x$ from the $x$ accelerometer 50. Multiplier circuit 90 provides at the output thereof the signal $v.a_y$ representative of the product of the signal $v$ from $v$ computer 30 and the signal $a_y$ from $y$ accelerometer 60. Multiplier circuit 100 provides a signal representative of $w.a_z$ representative of the product of the signal $w$ from $w$ computer 40 and the signal representative of $a_z$ from $z$ accelerometer 70.

The outputs of multiplier circuits 80, 90 and 100 representative of the signals $u.a_x$, $v.a_y$ and $w.a_z$ are added in adder circuit 110 to provide a signal representative of the sum $u.a_x + v.a_y + w.a_z$. This sum is then multiplied by a factor $1/g$ in amplifier circuit 120 to provide at the output thereof the signal $\dot{e}$ representative of the rate of change of specific energy of the aircraft. In the system of FIG. 1, this signal $\dot{e}$ is coupled to rate of change of energy indicator 130 to provide pilot display thereof.

As hereinbefore mentioned due to the nature of the dynamics of the phugoid mode of oscillation of aircraft whereby energy exchange takes place between altitude and speed of the aircraft, the rate of change of energy signal here $\dot{e}$ may be utilized in aircraft automatic control systems to improve mode damping and reduce coupling between speed and flight path control. Turning now to FIG. 2 it may be seen how the signal $\dot{e}$ from $\dot{e}$ computer circuit 200 may be utilized by coupling to an aircraft performance computer 300 which further utilizes the $\dot{e}$ signal to compute steering commands for optimal performance in aircraft maneuvering through $$\begin{array}{llll}
u = \dot{N}\cos\psi.\cos\theta & + \dot{E}(\sin\psi.\cos\theta) & -\dot{D}.\sin\theta & \\
v = \dot{N}(-\cos\psi.\sin\theta.\sin\phi - \sin\psi.\cos\phi) & + \dot{E}(-\sin\psi.\sin\phi.\sin\phi + \cos\psi.\cos\phi) & +\dot{D}.\cos\theta.\sin\phi & (8) \\
w = \dot{N}(-\cos\psi.\sin\theta.\cos\phi - \sin\psi.\sin\phi) & + \dot{E}(-\sin\psi.\sin\phi.\cos\phi - \cos\psi.\sin\phi) & +\dot{D}.\cos\theta.\cos\phi &
\end{array}$$

where
$\dot{N} =$ airplane's inertial velocity component in the North direction.

$\dot{E} =$ the airplane's inertial velocity component in the East direction.

$\dot{D} =$ airplane's vertical velocity component (positive down).

The aforementioned signal outputs representative of velocity components $u$, $v$ and $w$ are coupled respectively as inputs to multiplier circuits 80, 90 and 100 respectively in order to provide the signal representative of $\dot{e}$ downstream which is coupled to drive rate of change of energy indicator 130. Signals representative of inertial velocity components $\dot{N}$, $\dot{E}$ and $\dot{D}$ and signals the aircraft autopilot 301 or flight director 302. Performance computer 300 as known to those skilled in the art utilizes aircraft operating conditions, has aircraft operating characteristics stored therein and generates for a given state (e.g. given flap conditions etc.) a steering command.

A further system embodiment as shown in FIG. 3 shows a further automatic system utilization means 400 viz. the aircraft automatic flight control system 400 coupled to $\dot{e}$ computation circuit 200 for utilizing the signal $\dot{e}$ representative of the rate of change of specific energy. Further systems utilizing the accurate signal $\dot{e}$ will become apparent to those skilled in the art following the teachings of this invention showing the manner of generating the $\dot{e}$ signal and the aforementioned systems illustrative of the utilization thereof.

What is claimed is:

1. In combination for use in an aircraft:
   an aircraft flight control system; means for sensing the inertial acceleration of the aircraft; means for sensing the inertial velocity of the aircraft, means for calculating the inner vector product of inertial acceleration and inertial velocity of the aircraft in response to each said sensing means and, generating a signal representative of said inner vector product; and,
   said aircraft flight control system being responsive to said signal representative of the inner vector product of inertial acceleration and inertial velocity of the aircraft.

2. The combination according to claim 1 wherein said aircraft flight control system includes an aircraft performance computer coupled to an aircraft autopilot system.

3. A system for flight control of an aircraft comprising in combination:
   first, second and third accelerometers disposed in the aircraft for providing first, second and third accelerometer output signals;
   means for providing a first signal representative of inertial velocity along a first axis of the aircraft, a second signal representative of inertial velocity along a second axis of the aircraft, and the third signal representative of inertial velocity along yet another axis of the aircraft;
   a first multiplier circuit for providing an output which is the product of said first accelerometer signal and a signal representative of inertial velocity along a given axis of the aircraft;
   a second multiplier circuit for providing an output which is the product of said second accelerometer output signal and said second signal representative of inertial velocity along a further axis of the aircraft;
   a third multiplier circuit for providing an output which is the product of said third accelerometer output signal and said third signal representative of inertial velocity along yet another axis of the aircraft;
   adder circuit means responsive to the outputs of said first, second and third multiplier circuit means for providing an output signal;
   amplifier circuit means for multiplying said adder circuit output signal by a factor $1/g$ where $g$ equals acceleration due to gravity and providing an output signal $e$ representative of the rate of change of specific energy of the aircraft; and,
   utilization means responsive to the output signal of said amplifier circuit means for enabling flight control of the aircraft.

4. In combination in an aircraft, a system for computing the rate of change of specific energy of the aircraft for coupling to a utilization device in said aircraft; said system comprising:
   $x$, $y$, $z$ accelerometers aligned with respectively the $x_b$-axis, $y_b$-axis and $z_b$-axis of the aircraft for providing $a_x$, $a_y$ and $a_z$ accelerometer output signals;
   means for providing a signal representative of the inertial velocity component $u$ of the aircraft along the $x_b$-axis, means for providing a signal representative of the inertial velocity component $v$ of said aircraft along the $y_b$-axis, and means for providing a signal representative of the inertial velocity component $w$ of said aircraft along the $z_b$-axis;
   multiplier circuit means for combining said signal representative of the inertial velocity component $u$ and said signal $a_x$ from the output of said $x$ accelerometer for providing a signal $u.a_x$ representative of the product of said signals $u$ and $a_x$;
   multiplier circuit means for combining said signal representative of the inertial velocity component $v$ and said signal $a_y$ from the output of said $y$ accelerometer for providing a signal $v.a_y$ representative of the product of said signals $v$ and $a_y$;
   multiplier circuit means for combining said signal representative of the inertial velocity component $w$ and said signal $a_z$ from the output of said $z$ accelerometer for providing a signal $w.a_z$ representative of the product of said signals $w$ and $a_z$;
   adder circuit means for combining said signals $u.a_x$, $v.a_y$ and $w.a_z$ to provide a signal representative of the sum $u.a_x + v.a_y + w.a_z$; and,
   amplifier circuit means for multiplying said signal representative of the sum $u.a_x + v.a_y + w.a_z$ by a factor $1/g$ where $g$ equals acceleration due to gravity and providing at the output thereof the signal $\dot{e}$, representative of the rate of change of specific energy of said aircraft.

5. The system of claim 4 wherein said means for providing signals representative of the inertial velocity components $u$, $v$, $w$ along respectively the $x_b$, $y_b$ and $z_b$ axes includes:
   means for providing signals representative of the inertial velocity components $\dot{N}$, $\dot{E}$ and $\dot{D}$ of said aircraft relative to an earth fixed orthogonal coordinate system;
   means for providing signals representative of the Euler angles of rotation of the aircraft fixed orthogonal $x_b$, $y_b$ and $z_b$ axes relative to earth fixed orthogonal coordinate system; and,
   means for computing said inertial velocity components $u$, $v$, $w$, according to the formulas:

| | | |
|---|---|---|
| $u = \dot{N}\cos\psi . \cos\theta$ | $+ \dot{E}\sin\psi . \cos\theta$ | $- \dot{D}\sin\theta$ |
| $v = \dot{N}(\cos\psi . \sin\theta . \sin\phi - \sin\psi . \cos\theta)$ | $+ \dot{E}(-\sin\psi . \sin\theta . \sin\phi + \cos\psi . \cos\theta)$ | $+ \dot{D}\cos\theta . \sin\phi$ |
| $w = \dot{N}(\cos\psi . \sin\theta . \cos\phi - \sin\psi . \sin\theta)$ | $+ \dot{E}(-\sin\psi . \sin\theta . \cos\phi - \cos\psi . \sin\theta)$ | $+ \dot{D} . \cos\theta . \cos\phi$ |

6. The system of claim 5 wherein said signals representative of inertial velocity components $\dot{N}$, $\dot{E}$ and $\dot{D}$ of said aircraft relative to an earth fixed coordinate system are provided by an inertial navigation system.

7. The system of claim 5 wherein said signals repsentative of Euler rotation angles $\Psi$, $\theta$ and $\phi$ of the aircraft fixed coordinate system relative to the earth fixed reference coordinate system are provided by an inertial navigation system.

8. The system of claim 5 wherein said Euler rotation angles $\theta$ and $\phi$ are provided by vertical gyros and $\Psi$ is provided by a magnetic heading reference system.

9. The system of claim 5 wherein said signal $\dot{e}$ representative of the rate of change of specific energy of said aircraft is coupled to a rate of change of energy indicating instrument for use by the pilot of the aircraft to optimize aircraft maneuvering with respect to energy usage.

10. The system of claim 5 wherein said signal $\dot{e}$ representative of the rate of change of specific energy of said aircraft is coupled to an aircraft performance computer for computing steering commands for optimal aircraft maneuvering.

11. The system of claim 5 wherein said signal $\dot{e}$ representative of the rate of change of specific energy of said aircraft is coupled to an automatic aircraft control system for improving the damping of the coupling modes between speed and flight path control.

* * * * *